US010816796B2

(12) United States Patent
Sakai (10) Patent No.: US 10,816,796 B2
(45) Date of Patent: Oct. 27, 2020

(54) DISPLAY DEVICE AND OPTICAL ELEMENT

(71) Applicant: HAYASHI TELEMPU CORPORATION, Naka-ku, Nagoya-shi, Aichi (JP)

(72) Inventor: Takeya Sakai, Nagoya (JP)

(73) Assignee: HAYASHI TELEMPU CORPORATION, Naka-ku, Nagoya-shi, Aichi (JP)

( * ) Notice: Subject to any disclaimer, the term of this patent is extended or adjusted under 35 U.S.C. 154(b) by 220 days.

(21) Appl. No.: 16/148,006

(22) Filed: Oct. 1, 2018

(65) Prior Publication Data

US 2019/0056589 A1    Feb. 21, 2019

Related U.S. Application Data

(63) Continuation of application No. PCT/JP2017/012650, filed on Mar. 28, 2017.

(30) Foreign Application Priority Data

Apr. 5, 2016 (JP) ................... 2016-075586

(51) Int. Cl.
*G02B 5/30* (2006.01)
*G02B 27/01* (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
CPC ..... G02B 5/30; G02B 5/3083; G02B 27/0101
(Continued)

(56) References Cited

U.S. PATENT DOCUMENTS 5,510,913 A * 4/1996 Hashimoto ........ C09K 19/3809
349/11
5,579,139 A * 11/1996 Abileah ............ G02F 1/133502
349/117
(Continued)

FOREIGN PATENT DOCUMENTS

JP     47043845 A    11/1972
JP    2002202409 A    7/2002
(Continued)

OTHER PUBLICATIONS

International Search Report and English Translation thereof for International Application No. PCT/JP2017/012650, dated Jul. 4, 2017 (3 pages).

(Continued)

*Primary Examiner* — Ricky D Shafer
(74) *Attorney, Agent, or Firm* — Kagan Binder, PLLC (57) ABSTRACT

A display device has a display portion and a polarizing plate, the polarizing plate being provided on a viewing side of the display portion and having a transmission axis in a vertical direction with respect to the display portion, wherein at least one tilt orientation phase difference film is provided on a viewing side of the polarizing plate, and the tilt orientation phase difference film has such an arrangement structure that does not cause a phase difference for light emitted upward in the vertical direction, and causes a phase difference for light emitted in a lateral direction perpendicular to the vertical direction.

6 Claims, 6 Drawing Sheets

(51) Int. Cl.

| | | |
|---|---|---|
| *B60R 11/02* | (2006.01) | |
| *G02F 1/1335* | (2006.01) | |
| *G02B 5/00* | (2006.01) | |
| *G09F 9/33* | (2006.01) | |
| *G02F 1/13363* | (2006.01) | |
| *G09F 9/35* | (2006.01) | |
| *G09F 21/04* | (2006.01) | |
| *G09F 27/00* | (2006.01) | |
| *B60K 35/00* | (2006.01) | |

(52) U.S. Cl.
CPC ............... *G02B 5/00* (2013.01); *G02B 5/30* (2013.01); *G02B 5/3041* (2013.01); *G02F 1/133502* (2013.01); *G02F 1/133634* (2013.01); *G09F 9/33* (2013.01); *G09F 9/35* (2013.01); *G09F 21/04* (2013.01); *G09F 27/008* (2013.01); *B60K 2370/152* (2019.05); *B60K 2370/25* (2019.05); *B60K 2370/39* (2019.05); *G02B 2027/0118* (2013.01); *G02F 2413/02* (2013.01); *G02F 2413/06* (2013.01)

(58) Field of Classification Search
USPC .............................. 359/488.01, 489.07, 630
See application file for complete search history.

(56) References Cited

U.S. PATENT DOCUMENTS

| | | | | |
|---|---|---|---|---|
| 6,259,559 | B1* | 7/2001 | Kobayashi | B32B 17/10036 |
| | | | | 359/485.02 |
| 6,853,491 | B1* | 2/2005 | Ruhle | G02B 5/3016 |
| | | | | 359/630 |
| 10,656,415 | B2* | 5/2020 | Kuzuhara | G02B 27/0101 |
| 2007/0018907 | A1* | 1/2007 | Koma | G02B 27/0101 |
| | | | | 345/7 |
| 2011/0222263 | A1 | 9/2011 | Weber et al. | |
| 2014/0184996 | A1* | 7/2014 | Matsushita | G02B 27/0101 |
| | | | | 349/117 |
| 2020/0026073 | A1* | 1/2020 | Nambara | G02B 5/0816 |

FOREIGN PATENT DOCUMENTS

| | | |
|---|---|---|
| JP | 2004514167 A | 5/2004 |
| JP | 2004170696 A | 6/2004 |
| JP | 2008276149 A | 11/2008 |
| JP | 2009104008 A | 5/2009 |
| JP | 2011248114 A | 12/2011 |
| JP | 2015125240 A | 7/2015 |

OTHER PUBLICATIONS

Translation of the International Preliminary Report on Patentability for International Application No. PCT/JP2017/012650, dated Oct. 18, 2018 (7 pages).

Decision to Grant for Japanese Application No. 2018-510549, dated Jan. 14, 2020 (5 pages).

* cited by examiner

(DOOR GLASS SIDE)

DISPLAY DEVICE AND OPTICAL ELEMENT

CROSS REFERENCE TO THE RELATED APPLICATION

This application is a continuation application, under 35 U.S.C. § 111(a), of international application No. PCT/JP2017/012650, filed Mar. 28, 2017, which is based on and claims Convention priority to Japanese patent application No. 2016-075586, filed Apr. 5, 2016, the entire disclosure of which is herein incorporated by reference as a part of this application.

BACKGROUND OF THE INVENTION

Field of the Invention

The present invention relates to a display device for on-vehicle use, for example, and an optical element used for the display device.

Description of Related Art

Light emitted from a display screen of a display device includes diffused light, and for example, from a display screen of an on-vehicle display device, light is diffused also in directions other than a direction toward a driver. In particular, light diffused from the on-vehicle display device toward a windshield and a door glass (typically, window glass of a driver's seat side door) is reflected by the windshield and the door glass, whereby so-called mirror-like reflection or mirroring of a display content of the display screen occurs on the windshield and the door glass. The reflection deteriorates visibility for the driver.

From the above perspective, a light control film for controlling light from the display screen so as to be directed only in a predetermined direction is used in the display device. The light control film is a film having a minute louver structure and is capable of suppressing transmission of light directed in a specific direction. This can prevent the display content of the display screen such as a liquid crystal display from being reflected on a door glass or the like. Patent Document 1 discloses a method for manufacturing a light control film by skiving a billet formed by stacking transparent plastics and opaque plastics alternately.

Patent Document 2 discloses a method for manufacturing a light control film by preparing a light transmission film with a groove made from an ultraviolet-curable transparent material and then filling the groove of the film with a light absorbing resin. By such manufacturing methods, it is possible to manufacture a film that suppresses transmission of light directed in a specific direction, but there is a possibility that the manufacturing process is very complicated.

Besides, the light control film manufactured as described above has a louver structure in which transparent areas and light absorbing areas are alternately arranged in a stripe shape in a plan view. Therefore, if such a light control film is provided on the front side (viewer side, i.e., driver side) of the display screen of the display device which is a liquid crystal display or an organic EL display, moire (bright and dark fringes) can occur due to a relationship between the louver structure and pixel arrangement of a liquid crystal or organic EL display of the display device. The occurrence of moire causes a possibility of impairing the display quality. Further, since light absorbing regions are mixed in a stripe shape, the transmittance is lowered and thus the light usage efficiency is deteriorated. In addition, when the display screen is observed, there is a possibility in which, for example, the viewing angle property is narrowed. Accordingly, a liquid crystal display device inside which a polarizing plate is provided over the entire display screen often does not have such a light control film having a louver structure.

However, the liquid crystal display device having the above polarizing plate and not having a light control film having a louver structure still has the above possibility that mirror-like reflection on the door glass and the windshield occurs. Further, such on-vehicle display devices are often used at locations where external light is strong, and some observers who are drivers observe the display screen using polarizing spectacles. In a vehicle instrument panel, a car navigation device, or the like, such as a liquid crystal display device or an organic EL display device, configured from a display device using a polarization property of the polarizing plate, when an observer observes the display screen of the liquid crystal display device using polarizing spectacles, if, depending on the angle of the transmission axis of the polarizing plate on the viewer side of the display screen, the transmission axis coincides with the absorption axis of the polarizing spectacles of the observer, for example, the display is darkly viewed or the hue greatly varies, and thus a possibility of significantly deteriorating visibility can arise.

RELATED DOCUMENT

Patent Document

[Patent Document 1] JP Examined Patent Publication No. S47-43845

[Patent Document 2] JP Laid-open Patent Publication (translation of PCT application) No. 2004-514167

SUMMARY OF THE INVENTION

In view of the above problems, an object of the present invention is to provide a display device that suppresses mirror-like reflection on a surrounding object, e.g., in the case where the display device is for on-vehicle usage, suppresses mirror-like reflection on a door glass, and also suppresses mirror-like reflection on a windshield as much as possible and an optical element used for this display device. Further, an object of the present invention is to provide an on-vehicle display device in which, in the case of observing through polarizing spectacles, the display is less likely to be darkened and reduction in visibility is prevented and an optical element used for this display device.

A display device according to the present invention is a display device having a display portion and a polarizing plate, the polarizing plate being provided on a viewing side of the display portion and having a transmission axis in a vertical direction with respect to the display portion, wherein at least one tilt orientation or tilt-alignment phase difference film is provided on a viewing side of the polarizing plate, and the tilt orientation phase difference film has such an arrangement structure that does not cause a phase difference for light emitted upward in the vertical direction, and causes a phase difference for light emitted in a lateral direction perpendicular to the vertical direction. Here, the "vertical direction" refers to an up-down direction along a display portion such as a display screen.

In the display device according to the present invention, the polarizing plate having the transmission axis is provided, and the tilt orientation phase difference film has such an arrangement structure that does not cause a phase difference for light emitted upward in the vertical direction, and causes a phase difference for light emitted in the lateral direction. Here, for example, in the case where the display device according to the present invention is for on-vehicle usage, owing to the above arrangement structure, the polarization state of light emitted upward from the display portion such as the display screen and then reflected by the windshield or the like to be incident at the position (position of average line of sight) of an eye corresponding to an average line of sight of a driver, is kept as far as possible, and this light is incident on the windshield or the like with, for example, P-polarized light remaining as a main component. On the other hand, light emitted in the lateral direction from the display portion and then reflected by the door glass or the like to be incident at the position of the average line of sight of the driver has a phase difference, and as a result, the polarization state is converted so that this light becomes light including, for example, P-polarized light as a main component, then to be incident on the door glass or the like. Thus, mirror-like reflection on the door glass can be suppressed, and also mirror-like reflection on the windshield can be suppressed as much as possible. Further, in the case of observing through polarizing spectacles, the display is less likely to be darkened, and thus deterioration of visibility can be prevented.

Preferably, the tilt orientation phase difference film further has such an arrangement structure that converts one linearly polarized light to another linearly polarized light having a different plane of polarization. In this case, the polarization state of one linearly polarized light is converted so that this linearly polarized light becomes the same polarized light as another linearly polarized light having a different plane of polarization, for example, becomes light including, as a main component, the same P-polarized light. Therefore, as described above, mirror-like reflection on the door glass can be suppressed, and also mirror-like reflection on the windshield can be suppressed as much as possible. Further, in the case of observing through polarizing spectacles, the display is less likely to be darkened, and thus deterioration of visibility can be prevented.

Preferably, two of the tilt orientation phase difference film are provided, a principal axis of one of the two tilt orientation phase difference films is parallel to the transmission axis, and a principal axis of the other tilt orientation phase difference film has an angle with respect to the transmission axis. In this case, with respect to the plane of polarization of light emitted from the polarizing plate, for example, one principal axis that is a slow axis is parallel to the transmission axis of the polarizing plate, and for example, the other principal axis that is also a slow axis has an angle. Therefore, depending on the emission direction of the emitted light, the laminate of the two tilt orientation phase difference films can have an arrangement structure that causes less change in the polarization state of the emitted light. As a result, for example, light toward the windshield can keep a high proportion of the P-polarized light component with respect to the windshield, and thus reflecting by the windshield, i.e., mirror-like reflection on the windshield can be suppressed.

In this case, the principal axis of one tilt orientation phase difference film and the principal axis of the other tilt orientation phase difference film have an angle therebetween. Therefore, depending on the emission direction of the emitted light, the laminate of the tilt orientation phase difference films can have an arrangement structure that causes great change in the polarization state of the emitted light. As a result, for example, light toward the door glass changes to include, as a main component, P-polarized light with respect to the door glass, and thus reflecting by the door glass, i.e., mirror-like reflection on the door glass can be suppressed.

In addition, in the above configuration, as for light emitted from the display portion and directly traveling toward the viewer, a phase difference does not occur because the principal axis of one tilt orientation phase difference film is parallel to the transmission axis of the polarizing plate, and meanwhile, a phase difference occurs because the principal axis of the other tilt orientation phase difference film is not parallel to the transmission axis of the polarizing plate. However, in this light, owing to the viewing angle characteristic of phase differences of the two tilt orientation phase difference films, change in the polarization state is small as compared to, for example, the light toward the door glass direction in which S-wave linearly polarized light is converted to P-wave linearly polarized light so that the polarization state greatly changes as described above. Therefore, the polarization state of the light emitted from the display screen and directly traveling toward the viewer does not become a linearly polarized state but becomes an elliptically polarized state, and even in the case of observing the display screen of the on-vehicle display device through polarizing spectacles, the screen is not darkened.

In the display device, a louver film may be provided. In this case, by using a film having a minute louver structure for controlling light from the display portion so as to be directed only in a predetermined direction or suppressing transmission of light directed in a specific direction, it is possible to prevent the display content of the display portion such as a liquid crystal display from being reflected on the windshield or the door glass.

The present inventor has made an earnest study of an optical element used for a display device in order to solve the above problems, and as a result, has found out that it is possible to solve the problems of the conventional technology by the following technology. This technology includes combining a polarizing plate and at least one tilt orientation phase difference film in this order from the viewing side, and (i) setting the absorption axis of the polarizing plate and the slow axis of the tilt orientation phase difference film within a predetermined range, (ii) setting the in-plane phase difference of the tilt orientation phase difference film within a predetermined range, and further setting the average tilt angle with respect to the film plane inside of the tilt orientation phase difference film, within a predetermined range.

Therefore, preferably, in the above display device, a cover is provided on the viewing side, and the following transmissive optical element having a polarizing plate and at least one tilt orientation phase difference film in this order from the viewing side, is provided in the cover.

Here, the optical element according to the present invention is configured such that (i) an absorption axis of the polarizing plate and a slow axis of the tilt orientation phase difference film are within a range of +15 degrees to +55 degrees and −15 degrees to −55 degrees, and (ii) the tilt orientation phase difference film has an in-plane phase difference of 110 nm to 240 nm, and an average tilt angle $\gamma$ with respect to a film plane inside is 22 degrees to 55 degrees.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF EMBODIMENTS

Hereinafter, the first embodiment of the present invention will be described with reference to the drawings. In the present embodiment, an on-vehicle display device which is a liquid crystal display device or an organic EL display device will be described as an example. For comparison, first, a general display device which is not the display device according to the present embodiment will be described with reference to FIG. 1, and next, the display device according to the present embodiment will be described with reference to FIG. 2.

Figure 1:
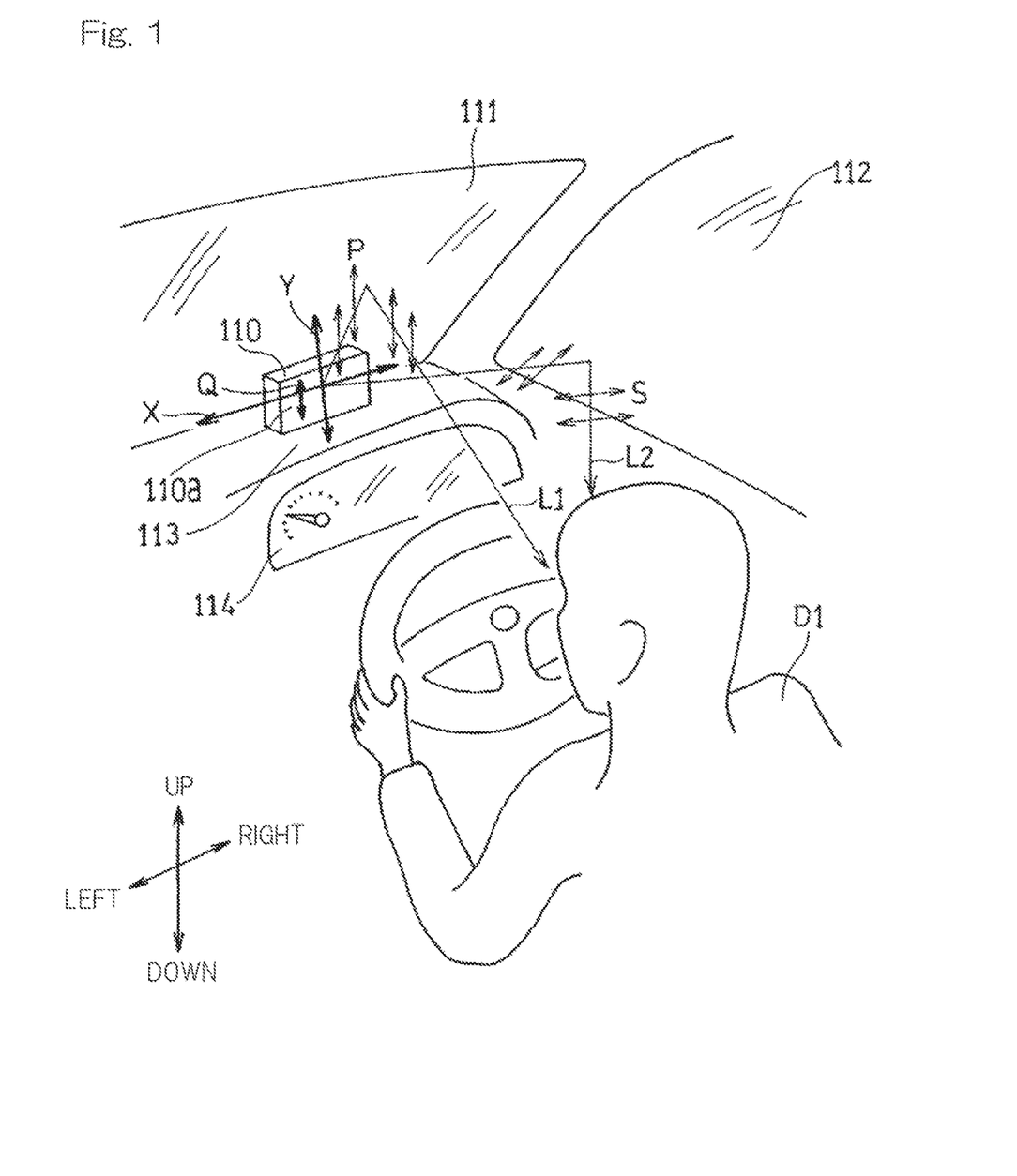
FIG. 1 is a schematic view illustrating, for comparison, mirror-like reflection on a windshield and a door glass in the case of a display device that is not a display device according to the first embodiment of the present invention.

As shown in FIG. 1, as an on-vehicle display device, a display device such as an IPS-type liquid crystal display device is used in which a transmission axis Q of a polarizing plate on the viewer side, i.e., the driver side inside the display device coincides with the vertical direction (typically, the vertical direction with respect to the width direction of the display screen) Y which is the up-down direction along the display screen as seen from the normal direction of the display screen. In the case where the on-vehicle display device 110 is provided on the top surface of a dashboard 113 or inside an instrument panel 114 from the perspective of visibility (in the present embodiment, the top surface of the dashboard 113 is employed as an example), light L1 emitted upward from a display screen 110a of the display device 110 and then reflected by a windshield 111 to be incident at a position (hereinafter, simply referred to as position of average line of sight) of an eye corresponding to an average line of sight of a driver D1, includes, as a main component, P-polarized light (arrows P in the drawing) with respect to the windshield 111. It is noted that light emitted downward from the display screen 110a also includes P-polarized light as a main component. Here, in FIG. 1, a transmission axis Q of a polarizing plate (not shown) is in the vertical direction Y perpendicular to the width direction of the laterally-long display screen 110a of the display device 110, and typically, almost in the vertical up-down direction, i.e., the vertical direction or a direction inclined, for example, slightly frontward from the vertical direction (forward inclined direction).

On the other hand, light L2 emitted from the display screen 110a in the lateral direction (approximately a right-left direction with respect to the up-down direction) X perpendicular to the vertical direction Y and then reflected by the door glass 112 of a door on the driver side to be incident at the position of the average line of sight of the driver D1, includes, as a main component, S-polarized light (arrows S in the drawing) with respect to the door glass 112. Here, the display screen 110a is an example of a "display portion" as set forth in the present invention. The "display portion" refers to an area for display enclosed by, for example, a frame of the display device as viewed from outside, and includes, as well as the display screen 110a having a planar shape, an area on the viewer side of a display element group inside the display device, the display element group itself, an optical element provided on the viewer side of the display element group, or the like.

In general, it is known that, when light is incident with a certain angle on the interface between two materials having different refractive indices, the reflectance of P-polarized light which is a polarization component parallel to the incident surface and the reflectance of S-polarized light which is a polarization component perpendicular to the incident surface are different from each other, and the reflectance of the P-polarized light becomes 0 at the polarization angle (Brewster's angle), whereas the reflectance of the S-polarized light monotonically increases as the incident angle increases, and therefore the reflectance thereof does not become 0.

In the case where the on-vehicle display device 110 is located on the top surface of the dashboard 113 or inside the instrument panel 114 as described above, the light L1 emitted from the display screen 110a and then reflected by the windshield 111 to be incident at the position of the average line of sight of the driver D1, is P-polarized light with respect to the windshield 111 as described above, and this light is incident at an incident angle that is close to the polarization angle (Brewster's angle). Therefore, the light L1 is less likely to be reflected by the windshield 111, so that the display device 110 is less reflected thereon.

On the other hand, the light L2 emitted from the display screen 110a and then reflected by the door glass 112 to be incident at the position of the average line of sight of the driver D1 is S-polarized light with respect to the door glass 112 as described above, and therefore the light L2 is reflected by the door glass 112, so that mirror-like reflection on the door glass 112 occurs.

Figure 2:
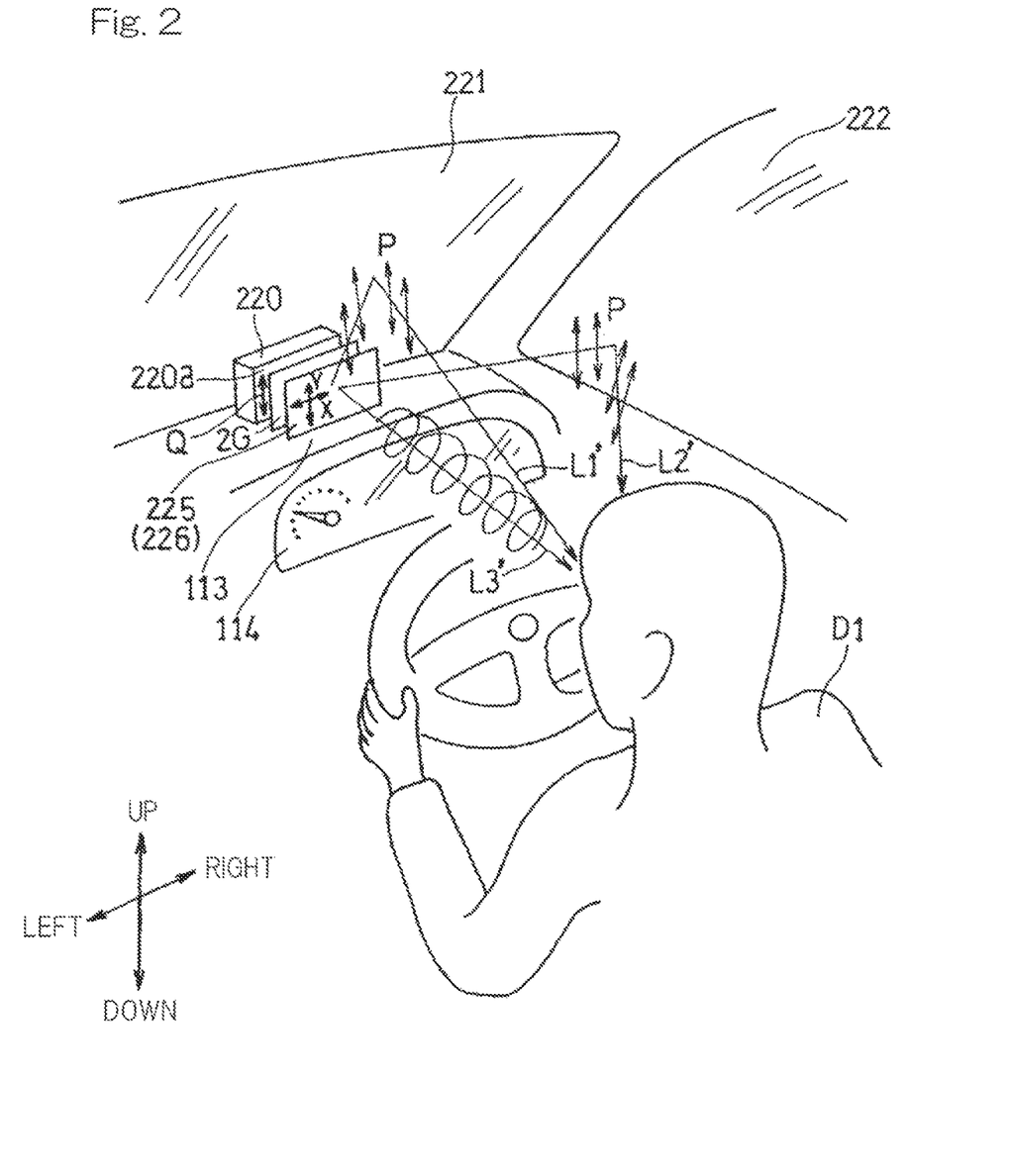
FIG. 2 is a schematic view illustrating an effect of preventing mirror-like reflection on a windshield and a door glass in the case of using the display devices according to the first and second embodiments.

However, a display device 220 according to the present embodiment shown in FIG. 2 prevents mirror-like reflections on the windshield 221 and the door glass 222. Namely, this is made by utilizing the fact that, when light is incident with a certain angle on the interface between two materials having different refractive indices, the reflectance of P-polarized light which is a polarization component parallel to the incident surface and the reflectance of S-polarized light which is a polarization component perpendicular to the incident surface are different from each other, and the reflectance of the P-polarized light becomes 0 at the polarization angle (Brewster's angle) as described above. It is noted that a cover 2G shown in FIG. 2 is not used in the description of the present embodiment and therefore is regarded as being not shown here. The cover 2G will be described in the next embodiment.

As shown in FIG. 2, in the present embodiment, the on-vehicle display device 220 is configured such that an optical element 226 including at least one tilt orientation phase difference film 225 is provided on the viewing side of the display screen 220a. The tilt orientation phase difference film 225 has such an arrangement structure that, for light emitted upward in the vertical direction Y, causes no phase difference so that the polarization state does not change, or an arrangement structure that suppresses the phase difference to be small so that change in the polarization state is small, and, for light emitted in the lateral direction (left direction or right direction) X, causes a phase difference so that change in the polarization state is great. The optical element 226 may be overlapped with a reinforcing glass or the like, to form a cover glass. The cover glass may be externally provided on the viewing side of the display screen 220a, or may be fixed integrally with the display device 220 by a predetermined frame of the display device 220, or the like.

Owing to the above arrangement structure of the tilt orientation phase difference film 225, light L1' emitted upward from the display screen 220a and then reflected by the windshield 221 to be incident at the position of the average line of sight of the driver D1 has a small phase difference and the polarization state thereof is kept as far as possible, so that the light L1' is incident on the windshield 221 with the P-polarized light remaining as a main component (arrows P in the drawing). On the other hand, the light L2' emitted in the lateral direction from the display screen 220a and then reflected by the door glass 222 to be incident at the position of the average line of sight of the driver D1 has a phase difference, and as a result, the polarization state thereof has been converted so that the light L2' becomes light including, as a main component, P-polarized light with respect to the door glass 222 (arrows P in the drawing).

From the above, regarding the light L1' and the light L2' emitted from the display screen 220a and then respectively reflected by the windshield 221 and the door glass 222 to be incident at the position of the average line of sight of the driver D1, occurrence of mirror-like reflection on the windshield 221 can be prevented and mirror-like reflection on the door glass 222 can be suppressed.

Further, light L3' emitted in the direction directly toward the driver D1 from the display screen 220a has been converted to elliptically polarized light by passing through the tilt orientation phase difference film 225. Therefore, even if the viewer wears polarizing spectacles such as sunglasses, display of the display screen 220a is less likely to be darkened and thus reduction in visibility can be suppressed.

The arrangement structure of the tilt orientation phase difference film 225 is not limited to the above one. For example, in the case where the light L1' incident on the interface between two materials having different refractive indices is mainly composed of S-polarized light and the light L2' incident on the interface is mainly composed of P-polarized light, the following arrangement structure may be employed. That is, the arrangement structure of the tilt orientation phase difference film 225 may be such an arrangement structure that causes a phase difference for the light L1' and converts the polarization state thereof so that the light L1' becomes light including P-polarized light as a main component, and reduces a phase difference occurring in the light L2' and keeps the polarization state thereof as far as possible so that the P-polarized light thereof remains as a main component. In the case where both of the light L1' and the light L2' incident on the interface are mainly composed of S-polarized light, the arrangement structure of the tilt orientation phase difference film 225 may be such an arrangement structure that converts the polarization states of both of the light L1' and the light L2' so that the light L1' and the light L2' become light including P-polarized light as a main component.

Figure 3:
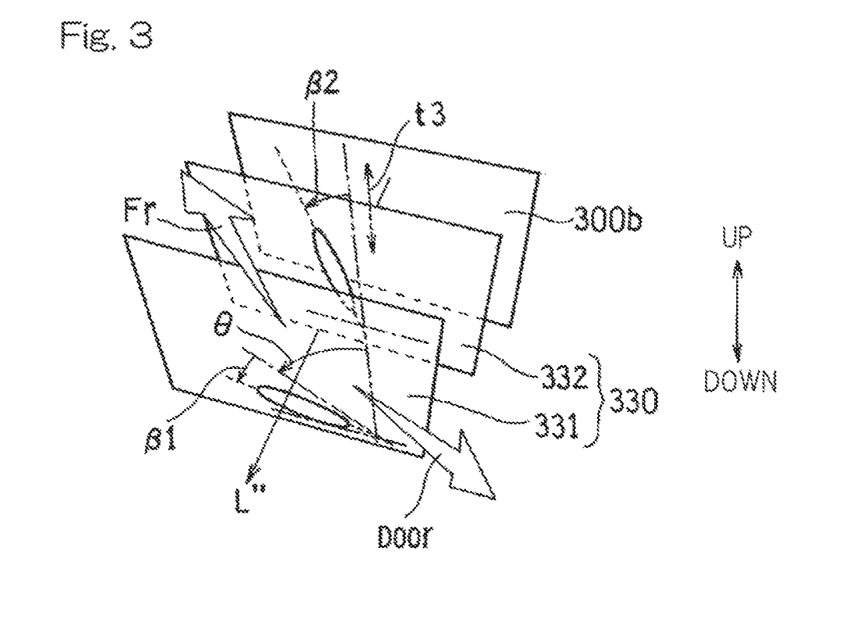
FIG. 3 is an exploded view schematically exemplifying an optical element according to the first embodiment.

As an example of a specific structure of such an optical element in the present embodiment, a film-like optical element 330 including a structure in which two different tilt orientation phase difference films 331, 332 are laminated as shown in an exploded view in FIG. 3 may be employed. FIG. 3 shows a structure in which, on the front side (viewing side) of the polarizing plate 300b provided on the viewing side of the display device (not shown) and having a transmission axis t3 in the vertical direction, a first tilt orientation phase difference film 331 and a second tilt orientation phase difference film 332 are laminated. The first tilt orientation phase difference film 331 has a tilt angle β1 and having an in-plane principal axis direction at an angle θ with respect to the transmission axis t3 of the polarizing plate 300b. The second tilt orientation phase difference film 332 has a tilt angle β2 and having an in-plane principal axis direction in parallel to the transmission axis t3 of the polarizing plate 300b.

Here, the principal axis is known as a term collectively referring to so-called fast axis and slow axis of birefringence, and in the following description, the principal axis refers to either one of these two axes (the principal axis has the same meaning between the first tilt orientation phase difference film 331 and the second tilt orientation phase difference film 332, for example, represents the same slow axis for both). A direction Fr shown in FIG. 3 is the emission direction of light toward the upward windshield in the case where, for example, the on-vehicle display device is provided on the top surface of the dashboard 113. Similarly, a direction Door is the emission direction of light toward the door glass located in the lateral direction. In addition, a direction L" is the emission direction of light toward the driver who is a viewer.

Figure 4:
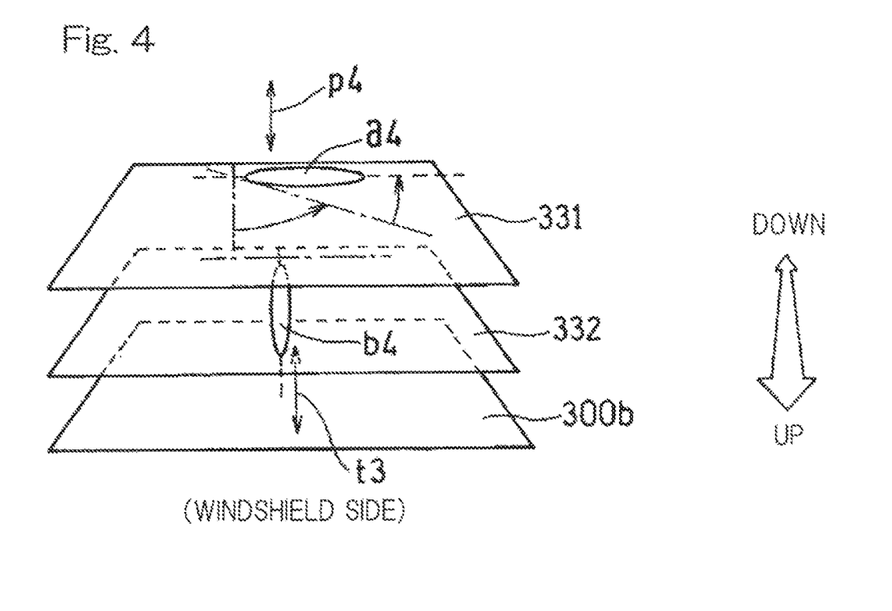
FIG. 4 is a schematically exemplified exploded view used for illustrating the case of observing the optical element configured as shown in FIG. 3, from a windshield direction.

FIG. 4 is a schematic exploded view illustrating index ellipsoids or refractive index ellipsoids a4, b4, of the tilt orientation phase difference films 331, 332, that are represented as ellipsoid curved surfaces in an orthogonal coordinate system of three axes, in the case of observing the optical element shown in FIG. 3 from the windshield direction Fr. That is, the near side in FIG. 4 is the windshield side. The index ellipsoids a4 and b4 of the first tilt orientation phase difference film 331 and the second tilt orientation phase difference film 332 are configured such that, with respect to the plane of polarization of light emitted from the polarizing plate 300b having the transmission axis t3, the major-axis direction of the index ellipsoid b4 is parallel to the light emission direction, and the major-axis direction of the index ellipsoid a4 is perpendicular to the light emission direction and the transmission axis t3. Thus, the laminate of the tilt orientation phase difference films 331, 332 has an arrangement structure in which change in the polarization state p4 of the emitted light is small. As a result, the light toward the windshield can keep a high proportion of the P-polarized light component with respect to the windshield, and therefore reflecting by the windshield, i.e., mirror-like reflection on the windshield can be suppressed.

Figure 5:
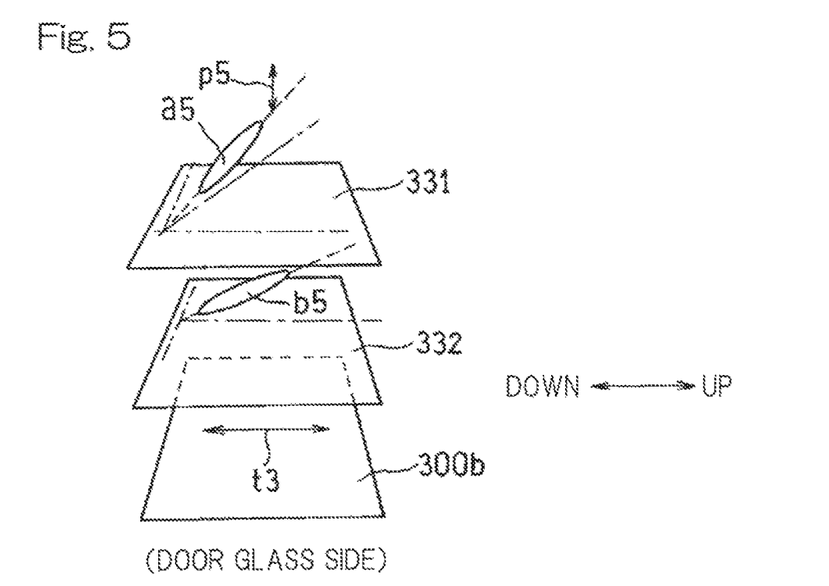
FIG. 5 is a schematically exemplified exploded view used for illustrating the case of observing the optical element configured as shown in FIG. 3, from a door glass direction.

FIG. 5 is a schematic exploded view illustrating index ellipsoids a5, b5 of the tilt orientation phase difference films 331, 332 in the case of observing the optical element shown in FIG. 3 from the door glass direction Door. That is, the near side in FIG. 5 is the door glass side. The index ellipsoids a5, b5 of the first tilt orientation phase difference film 331 and the second tilt orientation phase difference film 332 are configured such that, with respect to the plane of polarization of the light emitted from the polarizing plate 300b having the transmission axis t3, the major-axis directions of the index ellipsoids a5 and b5 are not parallel or perpendicular to the light emission direction or the transmission axis t3. That is, the laminate of the tilt orientation phase difference films 331, 332 has an arrangement structure in which a polarization state p5 of the emitted light greatly changes. As a result, the light toward the door glass changes so as to include, as a main component, P-polarized light with respect to the door glass, whereby reflecting by the door glass, i.e., mirror-like reflection on the door glass can be suppressed.

In FIG. 3, as for the light L" emitted from the display screen and directly traveling toward the position of the average line of sight of the driver who is a viewer, a phase difference does not occur because the in-plane principal axis direction (here, in-plane slow axis direction) of the second tilt orientation phase difference film 332 is parallel to the transmission axis t3 of the polarizing plate 300b, and meanwhile, a phase difference occurs because the in-plane slow axis direction of the first tilt orientation phase difference film 331 is not parallel to the transmission axis t3 of the polarizing plate 300b. However, in the light L", owing to the viewing angle characteristic of phase differences of the tilt orientation phase difference films 331, 332, change in the polarization state is small as compared to the light toward the door glass direction Door in which S-wave linearly polarized light is converted to P-wave linearly polarized light so that the polarization state greatly changes as described above. Therefore, the polarization state of the light L" emitted from the display screen and directly traveling toward the position of the average line of sight of the driver does not become a linearly polarized state but becomes an elliptically polarized state, and even in the case of observing the display screen of the on-vehicle display device through polarizing spectacles, the screen is not darkened.

In the present embodiment, the tilt orientation phase difference film provided on the viewer side which is the front side of the display screen is a film in which the distribution of phase difference values is asymmetric with respect to the normal direction of the film. Therefore, the present embodiment utilizes the characteristic that, in the tilt orientation phase difference film, the distribution of phase difference values, i.e., the axial direction of the index ellipsoid of the film varies depending on the incident angle of light. Owing to this characteristic, almost no phase difference occurs in the light L1' emitted from the display screen 220a shown in FIG. 2 and then reflected by the windshield 221 to be incident at the position of the average line of sight of the driver D1. Meanwhile, the light L2' reflected by the door glass 222 to be incident at the position of the average line of sight of the driver D1 and the light L3' emitted from the display screen 220a and directly traveling toward the driver D1 can be respectively caused to have phase differences that are different from each other.

As the tilt orientation phase difference film in the present embodiment, any film may be used as long as the phase difference value when the fast axis or the slow axis which is the principal axis in the sheet plane is a tilt axis is asymmetric with respect to the normal direction of the sheet. For example, the following films may be used: a film obtained by obliquely slicing a stretched polymer rod, a film obtained by stretching this obliquely sliced film, a film obtained by performing hybrid orientation for bar-like molecules or disc-like molecules on an oriented film, or a tilt orientation phase difference film formed from photo-orientation materials described in JP Laid-open Patent Publication No. 2002-202409, JP Laid-open Patent Publication No. 2004-170595, and JP Laid-open Patent Publication No. 2008-276149. However, the tilt orientation phase difference film in the present embodiment is not limited to those described here.

The tilt orientation phase difference film used in the present embodiment is a transparent film in which absorption in the visible light region is almost zero. Therefore, reduction in transmittance due to light absorption, which is occurred in the conventional technology, does not occur, and thus the light usage efficiency is high. In addition, the transparent film is merely provided on the front side of the display screen, and when the display screen is observed, the viewing angle characteristic is not narrowed and moire does not occur.

Next, examples of the present embodiment will be described.

Example A

Example A will be described below with reference to the schematic view in FIG. 3. On the front surface of a liquid crystal display device in which the transmission axis t3 of the polarizing plate 300b of the display screen was 90° with respect to the lateral direction, the above-mentioned second tilt orientation phase difference film 331 in which the angle of the in-plane slow axis direction was 90° with respect to the lateral direction, the tilt angle was 35°, and the in-plane phase difference was 96.5 nm, and the above-mentioned first tilt orientation phase difference film 332 in which the angle of the in-plane slow axis direction was 52°, the tilt angle was 23.5°, and the in-plane phase difference was 115.6 nm, were laminated and bonded by an adhesive agent, to prepare a laminate of the tilt orientation phase difference films 331, 332.

In this configuration, light emitted from the display screen to the door glass direction Door and then reflected by the door glass toward the driver became light including, as a main component, P-polarized light with respect to the door glass. In addition, light emitted toward the windshield direction Fr and then reflected by the windshield toward the driver became light including a high proportion of the P-polarized light component with respect to the windshield, though the polarization state thereof slightly changes. With the laminate of such tilt orientation phase difference films 331, 332 provided, when mirror-like reflection on the door glass was observed, it was confirmed that the mirror-like reflection thereon from the display screen was greatly suppressed. On the other hand, when mirror-like reflection on the windshield was observed, mirror-like reflection thereon from the display screen was recognized to a certain degree but significant mirror-like reflection did not occur. Further, when the display screen was observed through polarizing spectacles (polarizing sunglasses), the display screen was not darkened and the visibility was kept.

Example A1

Example A1 will be described below with reference to a schematic view shown in FIG. 6 corresponding to FIG. 3. On the front side of a liquid crystal display device in which a transmission axis t4 of a polarizing plate 300c of the display screen was 90° with respect to the lateral direction, an optical element 330' was provided which included only one above-mentioned tilt orientation phase difference film 333 in which the angle of the in-plane slow axis direction is 90° with respect to the lateral direction, a tilt angle β3 was 43°, and the in-plane phase difference was 116.3 nm. In the above example A, two tilt orientation phase difference films were provided and each configured such that the distribution of phase difference values was asymmetric with respect to the normal direction of the film, so that conversion from an S wave to a P wave was performed on only one of the right side and the left side. On the other hand, in the present example A1, the index ellipsoid was right-left symmetric, so that both of light toward the right door glass and light toward the left door glass were converted from an S wave to a P wave after being incident on the door glasses.

Figure 6:
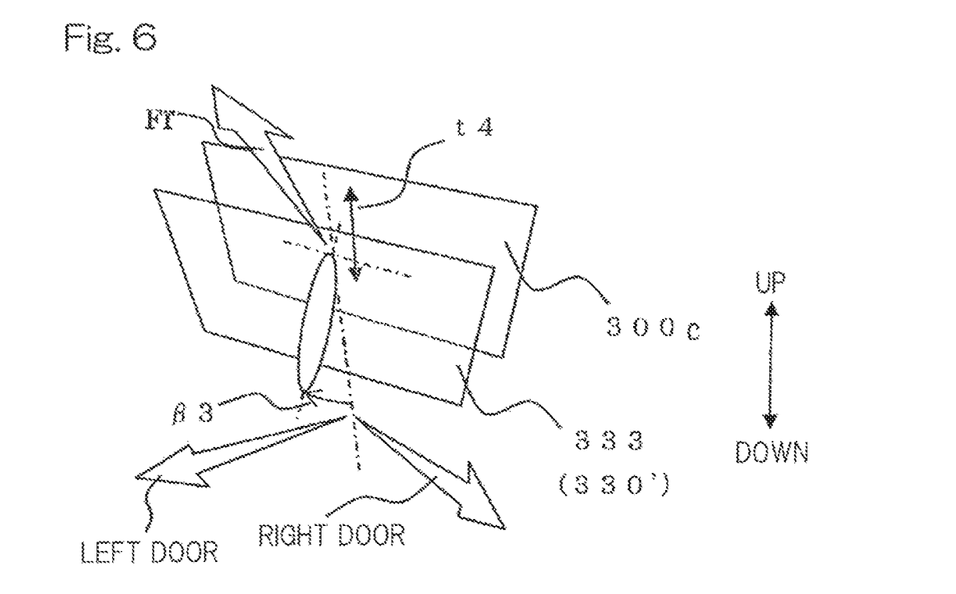
FIG. 6 is an exploded view schematically exemplifying an optical element according to example A1.
Figure 7:
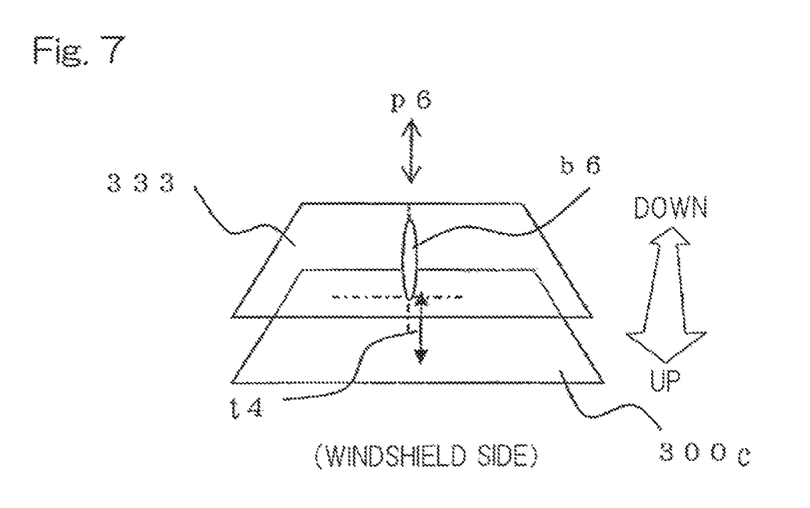
FIG. 7 is a schematically exemplified exploded view used for illustrating the case of observing the optical element configured as shown in FIG. 6, from a windshield direction.
Figure 8:
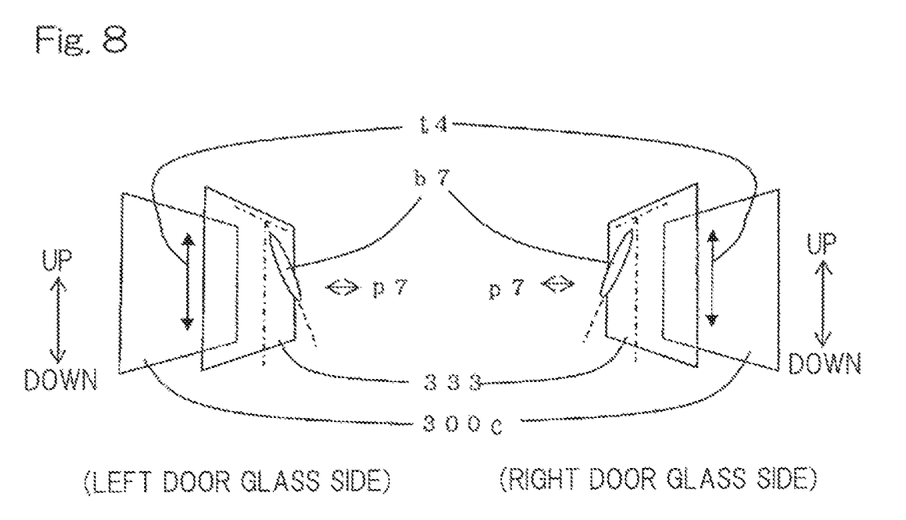
FIG. 8 is a schematically exemplified exploded view used for illustrating the case of observing the optical element configured as shown in FIG. 6, from left and right door glass directions.

The film-like optical element 330' as shown in the exploded view in FIG. 6 is provided on the viewing side of the display device (not shown). FIG. 7 which corresponds to FIG. 4 is a schematic exploded view illustrating an index ellipsoid b6 of the tilt orientation phase difference film 333 in the case of observing the optical element 330' shown in FIG. 6 from the windshield direction Fr. That is, the near side in FIG. 7 is the windshield side. The index ellipsoid b6 is configured such that, with respect to the plane of polarization of light emitted from the polarizing plate 300c having the transmission axis t4, the major-axis direction of the index ellipsoid b6 exists in a plane formed by the light emission direction and the transmission axis t4. FIG. 8 which corresponds to FIG. 5 is a schematic exploded view illustrating an index ellipsoid b7 of the tilt orientation phase difference film 333 in the case of observing the optical element 330' shown in FIG. 6 from the left and right door glass directions Door. That is, the near side in FIG. 8 is the left and right door glass sides. The index ellipsoid b7 is configured such that, with respect to the plane of polarization of light emitted from the polarizing plate 300c having the transmission axis t4, the major-axis direction of the index ellipsoid b7 exists in a plane formed by the light emission direction and the transmission axis t4.

In this configuration, light emitted from the display screen 220a (FIG. 2) in the left and right door glass directions Left Door and Right Door (FIG. 6) and then reflected by the door glass 222 (FIG. 2) and the like toward the driver became light including, as a main component, P-polarized light with respect to the door glass 222 and the like. On the other hand, light emitted in the windshield direction Fr (FIG. 6) and then reflected by the windshield 221 (FIG. 2) toward the driver D1 became light having undergone less change in the polarization state and including a high proportion of the P-polarized light component with respect to the windshield 221, because, when the tilt orientation phase difference film 333 (FIG. 6) was observed from the direction of mirror-like reflection on the windshield, the slow axis thereof was parallel to the transmission axis of the polarizing plate 300c (FIG. 6) of the display screen 220a. With the tilt phase difference film 333 provided, when mirror-like reflection on the door glass 222 and the like was observed, it was confirmed that the mirror-like reflection thereon from the display screen was greatly suppressed. On the other hand, when mirror-like reflection on the windshield 221 was observed, significant mirror-like reflection did not occur.

Example B

Example B will be described below. The laminate of the tilt orientation phase difference films 331, 332 in example A was used, and in addition, on a polarizing plate on the backlight side inside the display device, a louver film having a louver structure, in which transparent areas and light absorbing areas were alternately arranged in a stripe shape in a plan view, was mounted on the backlight side. In this configuration, the mirror-like reflection condition was observed in the same manner as in example A. As a result, mirror-like reflections on the door glasses and mirror-like reflection on the windshield were all suppressed, and this was considered at a practical level. Further, when the display screen was observed through polarizing sunglasses, the display screen was not darkened and the visibility was kept.

As described above, in example A, example A1, and example B, mirror-like reflections on the door glasses and mirror-like reflection on the windshield were all suppressed at a practical level, and in addition, in observation of the display screen through polarizing sunglasses, the display screen was not darkened and the visibility was kept at a practical level. Next, comparative examples will be described.

Comparative Example A

A liquid crystal display device in which the transmission axis of a polarizing plate on the viewing side inside the display device was 90° with respect to the lateral direction was placed on the upper portion of a vehicle instrument panel, e.g., a meter cluster panel, and when mirror-like reflection on the door glass was observed, it was confirmed that mirror-like reflection thereon from the display screen occurred at a significant level.

Comparative Example B

On the front side (viewing side) of the display screen of a liquid crystal display device in which the transmission axis of a polarizing plate on the viewing side inside the display device was 90° with respect to the lateral direction, a uniaxial phase difference film in which the phase difference value was 275 nm but the constituent molecules were not subjected to tilt orientation was bonded by an adhesive agent such that the angle of the slow axis was 45° with respect to the lateral direction. In this configuration, light emitted from the display screen toward the door glass and then reflected by the door glass toward the driver became light including, as a main component, P-polarized light with respect to the door glass. On the other hand, light emitted toward the windshield and then reflected by the windshield toward the driver became light including, as a main component, S-polarized light with respect to the windshield. In such a configuration, as in example A, when mirror-like reflection on the door glass was observed, it was confirmed that the mirror-like reflection thereon from the display screen was greatly suppressed. On the other hand, when mirror-like reflection on the windshield was observed, it was confirmed that the mirror-like reflection thereon from the display screen occurred at a significant level. In addition, when the display screen was observed through polarizing sunglasses, the display screen was significantly darkened and the visibility was significantly reduced.

Comparative Example C

In addition to the configuration in comparative example B, a louver film was mounted to a polarizing plate on the backlight side inside the display device, and then, as in example A, when mirror-like reflection on the door glass was observed, it was confirmed that the mirror-like reflection thereon from the display screen was greatly suppressed. On the other hand, when mirror-like reflection on the windshield was observed, the mirror-like reflection thereon from the display screen could not be sufficiently suppressed.

Comparative Example D

On the front side of a liquid crystal display device in which the transmission axis of a polarizing plate on the viewing side inside the display device was 90° with respect to the lateral direction, a louver film was provided such that the louver direction was 90° with respect to the lateral direction. The liquid crystal display device was placed on the upper portion of a vehicle meter cluster, and then, when mirror-like reflection on the door glass was observed, the mirror-like reflection thereon from the display screen could be suppressed, but when the display screen was directly observed, blur of the image and occurrence of moire were confirmed.

As described above, in comparative examples A to D, not all of suppression of mirror-like reflections on the door glasses, suppression of mirror-like reflection on the windshield, and keeping of the visibility without darkening of the display screen in observation of the display screen through polarizing sunglasses, were achieved.

Next, as the second embodiment, a transmissive optical element and a display device to which a cover including this optical element is mounted on the viewing side of the display screen, will be described. This transmissive optical element is composed of a polarizing plate and a tilt orientation phase difference film other than the above tilt orientation phase difference film 225 shown in FIG. 2, and which, as described below in more detail, has an element-side polarizing plate and at least one tilt orientation phase difference film in this order from the viewing side. That is, the cover (cover glass) 2G mounted to the display device in which the transmission axis of the polarizing plate on the viewing side of the display screen in FIG. 2 is set in the vertical direction, includes the optical element of the present embodiment. On the viewer side of the polarizing plate used for the optical element, in addition to the cover glass 2G, at least one tilt orientation phase difference film 225 is separately provided. Here, with respect to the display device, the tilt orientation phase difference film 225 has an arrangement structure in which change in the polarization state of light emitted upward is small and in which light emitted leftward or rightward in the lateral direction is caused to have a phase difference so that change in the polarization state thereof is great, as in the first embodiment.

Therefore, also in the display device of the present embodiment, in the case of on-vehicle usage, light toward the windshield can keep a high proportion of the P-polarized light component with respect to the windshield, and therefore mirror-like reflection on the windshield can be suppressed, and light toward the door glass undergoes polarization state conversion to become light including a high proportion of the P-polarized light component with respect to the door glass. Therefore, mirror-like reflection on the door glass can be suppressed, and further, in combination with a light shielding effect by the optical element of the present embodiment, mirror-like reflections on the windshield and the door glass can be suppressed at a higher level.

The optical element of the second embodiment further has a configuration described below. Therefore, mainly, the optical element of the second embodiment will be described in detail.

The optical element of the second embodiment is a transmissive optical element to be mounted to the display device, the optical element including a polarizing plate and at least one tilt orientation phase difference film in this order from the viewing side, the optical element being configured such that (i) the absorption axis of the polarizing plate and the slow axis of the tilt orientation phase difference film are within a range of +15 degrees to +55 degrees and −15 degrees to −55 degrees, and (ii) the tilt orientation phase difference film has an in-plane phase difference of 110 nm to 240 nm, and the average tilt angle γ with respect to the film plane inside is 22 degrees to 55 degrees.

Hereinafter, the basic configuration thereof will be described.

(Basic Configuration of Optical Element)

Figure 9:
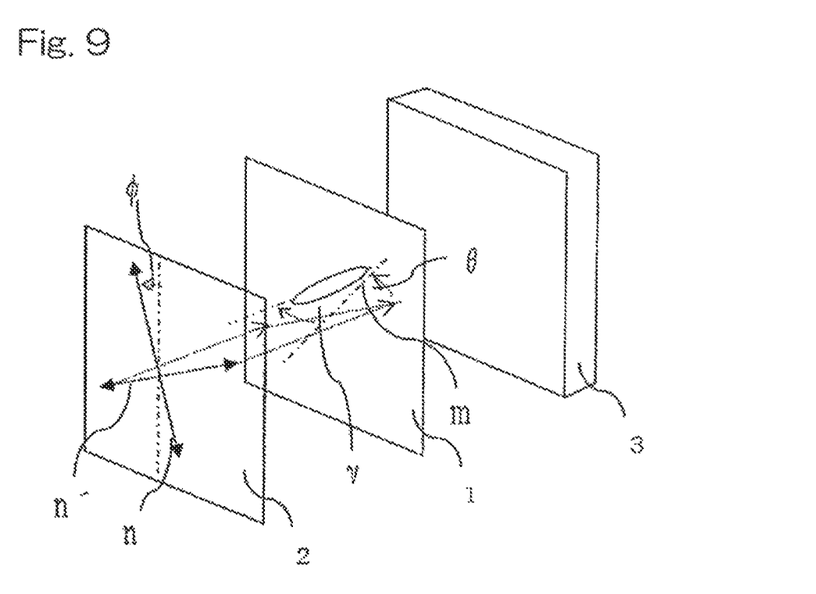
FIG. 9 is a schematic view showing an example of an optical element according to the second embodiment of the present invention.

The optical element of the present embodiment at least includes a polarizing plate and a tilt orientation phase difference film. As shown in FIG. 9, the optical element of the present embodiment is basically configured by laminating the tilt orientation phase difference film 1 and the polarizing plate 2. The polarizing plate 2 has a transmission axis n, and the transmission axis n is set to have an angle φ with respect to the vertical direction. On the other hand, the tilt orientation phase difference film 1 has a slow axis m, and the slow axis m is set to have an angle θ with respect to an absorption axis n' of the polarizing plate 2. Here, the tilt orientation phase difference film 1 has an average tilt angle γ with respect to the film plane of the tilt orientation phase difference film 1.

In FIG. 9, the optical element is mounted to the front side, i.e., the viewer side, of the display device 3. Therefore, the polarizing plate 2, the tilt orientation phase difference film 1, and the display device 3 are arranged in this order from the viewer side. At the interface between these components, an adhesive layer may be provided as necessary. In this case, it is preferable that air is not contained in the interface.

In the configuration of the present embodiment, the polarizing plate is provided on the viewing side, (i) the absorption axis of the polarizing plate and the slow axis of the tilt orientation phase difference film are set within a predetermined range, (ii) the in-plane phase difference of the tilt orientation phase difference film is set within a predetermined range, and (iii) the average tilt angle with respect to the film plane inside of the tilt orientation phase difference film is set within a predetermined range, thereby providing effects that, even if the optical element is provided outside the display screen, reflecting of external light can be suppressed, and light emitted from the display screen is inhibited from being reflected on the windshield or the like in the mirror-like reflection direction. Further, such a combination provides an effect of suppressing reflecting of external light even if the tilt orientation phase difference film composing the optical element is a single layer. It is noted that the mirror-like reflection direction may be, for example, an obliquely upward direction within a range of 45 degrees to 85 degrees with respect to, for example, the display screen.

First, setting of the absorption axis of the polarizing plate and the slow axis of the tilt orientation phase difference film within a predetermined range will be described. In the case where the absorption axis of the polarizing plate and the slow axis of the tilt orientation phase difference film (hereinafter, may be simply referred to as phase difference film or tilt orientation film) are combined at a predetermined angle, external light (natural light) that has passed through the polarizing plate mounted on the viewer side of the optical element becomes linearly polarized light, and thus only specific-direction light of the external light is incident on the phase difference film. In the light incident on the phase difference film, a phase difference occurs in relation to the transmission axis. Then, the light with the phase difference by the phase difference film is reflected by the back surface of the optical element and/or the front surface of the display device. The reflected light is incident on the phase difference film again and thus, further, a phase difference occurs in the phase difference film. In the optical element of the present embodiment, out of the incident light with the phase difference occurred again, a predetermined amount of incident light hardly passes through the transmission axis of the polarizing plate, and eventually, reflected light based on the external light can be suppressed. In addition, since reflected light can be suppressed without using a circular polarizing plate, the hue of the image can be inhibited from being changed.

Regarding the lamination angle θ between the absorption axis of the polarizing plate and the in-plane slow axis of the tilt orientation phase difference film (hereinafter, it may be simply referred to as lamination angle θ), the absorption axis of the polarizing plate and the in-plane slow axis of the phase difference film are set within a range of +15 degrees to +55 degrees and −15 degrees to −55 degrees (±15 degrees to ±55 degrees). Preferably, the lamination angle θ is set within a range of ±15 degrees to ±45 degrees, and more preferably, the lamination angle θ is set within a range of ±20 degrees to ±45 degrees. According to the optical element of the present embodiment, even in the case where the optical element is used for the display device with the polarizing plate mounted on the viewer side as an on-vehicle display device, it is possible to minimize reduction of brightness, and in particular, it is possible to highly suppress reflected light of external light incident on the display device from the obliquely upper side, e.g., from the windshield.

Hereinafter, the tilt orientation phase difference film will be described. Regarding the tilt orientation phase difference film, in a biaxial index ellipsoid having principal refractive indices nx, ny, nz in X-axis and Y-axis directions parallel to the film plane and a Z-axis direction in the film plane normal direction, the product of a film thickness d and the absolute value of the difference between ny and nx of a vertical elliptic plane formed, i.e., |ny−nx|×d, when observed from the Z-axis direction can be defined as an in-plane phase difference value. In the index ellipsoid, the angle of nz with respect to the film plane inside can be defined as a tilt angle. In particular, an average tilt angle means the average value of the angle between the plane inside and a tilted axis of the index ellipsoid or molecules constituting the tilt orientation phase difference film.

The tilt orientation phase difference film has an in-plane phase difference of 110 nm to 240 nm, and the average tilt angle γ with respect to the film plane inside is 22 to 55 degrees. If the tilt orientation phase difference film having such an in-plane phase difference value is combined with the polarizing plate in accordance with the relationship of the above (i), reflected light based on external light can be suppressed, and transmitted light in the mirror-like reflection direction, which causes mirror-like reflection of the display screen, can be suppressed. Preferably, the in-plane phase difference of the tilt orientation phase difference film may be 110 nm to 200 nm, and the average tilt angle γ with respect to the film plane inside may be 22 degrees to 55 degrees. Further preferably, the lamination angle θ, the in-plane phase difference of the tilt orientation phase difference film, and the average tilt angle γ may have the following relationship.

(I) In the case where the average tilt angle γ is not less than 35 degrees and not greater than 50 degrees,
the in-plane phase difference of the tilt orientation phase difference film may be 110 nm to 180 nm (preferably, 110 nm to 175 nm), and
the lamination angle θ may be 15 degrees to 45 degrees (preferably, 20 degrees to 40 degrees).

(II) In the case where the average tilt angle γ is not less than 29 degrees but is less than 35 degrees,
the in-plane phase difference of the tilt orientation phase difference film may be 110 nm to 205 nm (preferably, 110 nm to 180 nm), and
the lamination angle θ may be 25 degrees to 45 degrees (preferably, 25 degrees to 35 degrees).

(III) In the case where the average tilt angle γ is not less than 22 degrees but is less than 29 degrees,
the in-plane phase difference of the tilt orientation phase difference film may be 120 nm to 240 nm (preferably, 120 nm to 220 nm), and
the lamination angle θ may be 25 degrees to 45 degrees (preferably, 30 degrees to 45 degrees).

In the case where the phase difference value and the lamination angle are within such ranges as described above, it is possible to enhance the effect of suppressing external light reflecting, and improve the effect of preventing mirror-like reflection on the windshield. Further, from the perspective of improving the effect of preventing mirror-like reflection on the windshield, it is preferable that the transmission axis n of the polarizing plate 2 provided on the viewing side is set to have an angle cp of −15 degrees to +15 degrees with respect to the vertical direction.

In addition to enhancement of the effect of suppressing external light reflecting and improvement of the effect of preventing mirror-like reflection on the windshield, from the perspective of enabling suppression of reduction in the transmittance of the display device, it is preferable that the optical element has the following characteristics.

(i) the absorption axis of the polarizing plate and the slow axis of the tilt orientation phase difference film are within a range of +15 degrees to +40 degrees and −15 degrees to −40 degrees, and (ii) the tilt orientation phase difference film has an in-plane phase difference of 110 nm to 180 nm, and the average tilt angle γ with respect to the film plane inside is 29 degrees to 40 degrees.

Particularly preferably, the lamination angle θ, the in-plane phase difference of the tilt orientation phase difference film, and the average tilt angle γ may have the following relationship.

(I) In the case where the average tilt angle γ is not less than 35 degrees and not greater than 50 degrees, the in-plane phase difference of the tilt orientation phase difference film may be 110 nm to 175 nm (preferably, 110 nm to 150 nm), and the lamination angle θ may be 20 degrees to 40 degrees (preferably, 20 degrees to 30 degrees).

(II) In the case where the average tilt angle γ is not less than 29 degrees but is less than 35 degrees, the in-plane phase difference of the tilt orientation phase difference film may be 110 nm to 180 nm (preferably, 110 nm to 140 nm), and the lamination angle θ may be 25 degrees to 35 degrees (preferably, 25 degrees to 30 degrees).

(Polarizing Plate)

In the present embodiment, the polarizing plate is a plate that allows only light polarized in a specific direction to pass therethrough. As the polarizing plate, it is possible to use a known one such as a polarizing plate that has, as a polarizing film, a uniaxial stretched polyvinyl alcohol resin film dyed by iodine, a dichroic dye, or the like. For example, the polarizing plate may be formed by treating, with boric acid, a uniaxial stretched polyvinyl alcohol resin film dyed by iodine or a dichroic dye, and then laminating a protection film such as a triacetylcellulose film on both surfaces or one surface of the treated uniaxial stretched polyvinyl alcohol resin film.

(Tilt Orientation Phase Difference Film)

In the present embodiment, the tilt orientation phase difference film is a film in which the phase difference value when the fast axis or the slow axis in the sheet plane is a tilt axis is asymmetric with respect to the normal direction of the sheet. In the tilt orientation film, the phase difference value when light is obliquely incident is greater than the phase difference value when light is perpendicularly incident from the front side, and the slow axis direction when light is perpendicularly incident from the front side, and the slow axis direction when light is obliquely incident, are changed.

As an example of such a tilt orientation phase difference film, the following films may be used: a film obtained by obliquely slicing a stretched polymer rod, a film obtained by stretching this obliquely sliced film, a film obtained by performing hybrid orientation for bar-like molecules or disc-like molecules on an oriented film, or a tilt orientation phase difference film formed from photo-orientation materials described in JP Laid-open Patent Publication No. 2002-202409, JP Laid-open Patent Publication No. 2004-170595, and JP Laid-open Patent Publication No. 2008-276149. By controlling the molecule orientation in the film, it is possible to set the in-plane phase difference of the film and the average tilt angle with respect to the film plane inside, within predetermined ranges.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . tilt orientation phase difference film
2 . . . polarizing plate
3 . . . display device
110, 220 . . . display device
110a, 220a . . . display screen (display portion)
225 . . . tilt orientation phase difference film
226, 330, 330' . . . optical element
300b, 300c . . . polarizing plate
331, 332, 333 . . . tilt orientation phase difference film
L1, L2, L1', L2', L3', L" . . . light
p4, p5, p6, p7 . . . polarization state
P . . . P-polarized light
Q . . . transmission axis (principal axis)
S . . . S-polarized light
t3, t4 . . . transmission axis (principal axis)
X . . . lateral direction
Y . . . vertical direction
θ . . . angle between slow axis m of tilt orientation phase difference film and absorption axis n' of polarizing plate
φ . . . angle between transmission axis n of polarizing plate and vertical direction
γ . . . average tilt angle with respect to film plane of tilt orientation phase difference film

What is claimed is:

1. A display device having a display portion and a polarizing plate, the polarizing plate being provided on a viewing side of the display portion and having a transmission axis in a vertical direction with respect to the display portion, wherein
at least one tilt orientation phase difference film is provided on a viewing side of the polarizing plate, and
the tilt orientation phase difference film has such an arrangement structure that does not cause a phase difference for light emitted upward in the vertical direction, and causes a phase difference for light emitted in a lateral direction perpendicular to the vertical direction.

2. The display device as claimed in claim 1, wherein
the tilt orientation phase difference film further has such an arrangement structure that converts one linearly polarized light to another linearly polarized light having a different plane of polarization.

3. The display device as claimed in claim 1, wherein
two of the tilt orientation phase difference film are provided, and
a principal axis of one of the two tilt orientation phase difference films is parallel to the transmission axis, and a principal axis of the other tilt orientation phase difference film has an angle with respect to the transmission axis.

4. The display device as claimed in any one of claim 1, wherein
a louver film is provided.

5. The display device as claimed in any one of claim 1, wherein
a cover is provided on the viewing side,
a transmissive optical element having an element-side polarizing plate and at least one tilt orientation phase difference film in this order from the viewing side, is provided in the cover, and
the optical element is configured such that
(i) an absorption axis of the element-side polarizing plate and a slow axis of the tilt orientation phase difference film are within a range of +15 degrees to +55 degrees and −15 degrees to −55 degrees, and
(ii) the tilt orientation phase difference film has an in-plane phase difference of 110 nm to 240 nm, and an average tilt angle γ with respect to a film plane inside is 22 degrees to 55 degrees.

6. A transmissive optical element used for the display device as claimed in claim 1, the transmissive optical element comprising an element-side polarizing plate and at least one tilt orientation phase difference film in this order from the viewing side, wherein
  (i) an absorption axis of the element-side polarizing plate and a slow axis of the tilt orientation phase difference film are within a range of +15 degrees to +55 degrees and −15 degrees to −55 degrees, and
  (ii) the tilt orientation phase difference film has an in-plane phase difference of 110 nm to 240 nm, and an average tilt angle $\gamma$ with respect to a film plane inside is 22 degrees to 55 degrees.

* * * * *